United States Patent [19]

Cree et al.

[11] Patent Number: 4,866,611
[45] Date of Patent: Sep. 12, 1989

[54] METHOD FOR AUTOMATICALLY RECONCILING ENTRIES ON TWO COPIES OF INDEPENDENTLY MAINTAINED ELECTRONIC CALENDARS

[75] Inventors: Charles M. N. Cree; Grady J. Landry; Keith J. Scully, all of Austin, Tex.; Harinder S. Singh, Boca Raton, Fla.

[73] Assignee: International Business Machines Corporation, Armonk, N.Y.

[21] Appl. No.: 8,249

[22] Filed: Jan. 29, 1987

[51] Int. Cl.$^4$ .......................... G06F 7/00; G06F 15/00
[52] U.S. Cl. ..................................... 364/300; 364/900; 364/974; 364/962; 364/918; 364/947.2; 340/706; 368/28
[58] Field of Search ..... 364/900, 705.8, 200 MS File, 364/900 MS File, 300; 368/10, 28, 41; 340/706, 825.55; 40/107

[56] References Cited

U.S. PATENT DOCUMENTS

| | | | |
|---|---|---|---|
| 4,121,196 | 10/1978 | Johnson et al. | 364/900 |
| 4,162,610 | 7/1979 | Levine | 368/28 |
| 4,319,337 | 3/1982 | Sander et al. | 364/900 |
| 4,380,009 | 4/1983 | Long et al. | 340/825.55 |
| 4,548,510 | 10/1985 | Levine | 368/10 |
| 4,626,836 | 12/1986 | Curtis et al. | 340/706 |
| 4,769,796 | 9/1988 | Levine | 368/29 |
| 4,774,697 | 9/1988 | Alhara | 368/41 |
| 4,783,800 | 11/1988 | Levine | 379/67 |

*Primary Examiner*—Eddie P. Chan
*Assistant Examiner*—Adolfo Ruiz
*Attorney, Agent, or Firm*—R. E. Cummins

[57] ABSTRACT

An electronic calendaring method for use in a data processing system in which calendar entries that have been made for the same time span independently on two different copies of the calendar can be automatically and interactively reconciled. The method permits a calendar owner to obtain a machine readable transportable copy of his calendar on a diskette, to update that copy when the master copy is not available to him because of a business trip, for example, and upon his return to automatically and interactively reconcile the updated entries that have been made to both copies so that at least one of them reflects the correct status of calendered events for that owner.

11 Claims, 4 Drawing Sheets

MOVE THE CURSOR TO EACH SELECTION OR KEY THE ITEM DIRECTLY AND HIT ENTER

```
                                        August          1986
1. Calendar Entry, Meeting,                              1  2
   Appointment, Trigger,                 3  4  5  6  7  8  9
   Note, Vacation,                      10 11 12 13 14 15 16
   Holiday, Offsite,                    17 18 19 20 21 22 23
   Not Normal Work Hours                24 25 26 27 28 29 30
                                        31
2. View Select
                                        September       1986
                                         1  2  3  4  5  6
3. Composite Calendar                    7  8  9 10 11 12 13
                                        14 15 16 17 18 19 20
4. Automatic Response                   21 22 23 24 25 26 27
                                        28 29 30
5. Reconcile 6. Conference Room Command:_____(Key item nimber or item initials)

PF1=Help    PF2=Return to System    PF8=Next Screen
```

FIG. 3a

MOVE THE CURSOR TO EACH SELECTION OR KEY THE ITEM DIRECTLY AND HIT ENTER
Classification List: Meeting  Appointment  Offsite  Vacation  Holiday
   (PICK ONE)        Note  Not Normal Work Hours
Additional Criteria:BX Priority X (X = 1 to 10) C OPEN TIME
         D USER DEFINEDFIELF (D + 8 Characters)
CLASSIFICATION 1 (Select one classification from the above list)
   USER DEFINED FIELD _____PRIORITY____1 = Highest:10 lowest
      (1 IS THE HIGHEST, 10 IS THE LOWEST. PRIORITY IS THE DEFAULT CRITERIA)
Event Itentifier: _____
MEETING/APPOINTMENT INFORMATION:
            Date 10/07/86     Start Time:1:15 PM     End Time: 5:00 PM
            Date 10/09/86     Start Time:8:30 PM     End Time: 5:00 PM
            Names List: D35 NAMES A1
            Caller:  TOM ROBERTS
            Subject: 1987  Budget
            Place:   Conference Room 128F
            Details: _____
 Auto Schedule: YES  NO           Event Duration (Minutes)_____(1 to 480)
       SEARCH CRETERIA;_____
Key in creteria separated by space from the list below.
Priority X  Any Classification+(Confirmed or Tentative)+(Attending or May
Attend)  Open Time   Not Normal Work Hours   User Defined Field (PF 11 will scroll and add additional Date lines while on the Date Line)
(Rx after Date will repeat the event at the same time, x number of days)

PF1=Help   PF3=Cancel  PF5=Send Notice PF6=Begin Search
PF8=Next Screen(Security, Status, Trigger)  PF9=File  PF10=Add One Line

FIG. 3b

MOVE THE CURSOR TO EACH SELECTION OR KEY THE ITEM DIRECTLY AND HIT ENTER

SECURITY:     Public    Shared    PrivateU
   (pick one)
STATUS:       Tentative          Confirmed
   (pick one)
TRIGGER:      Message   Audio    Process
   (All three may be picked)
      Date: 10/07/86     Time: 1:00 PM
      Date: 10/09/86     Time: 8:00 AM
(PF11 will scroll and add additional Date Lines while on the Date line)
(Rx after Date will repeat the event at the same time, x number of days)
      Names List:_____
      Message:_____
(PF10 will add one message line if hit when entering Message)
      Process:_____

TRIGGER FIXED OR FLOAT?    Fixed     Float
   (pick one)
   Float with Event Identifier:_____
      (If this event moves, the trigger will be moved to the same relative time)

PF1=Help   PF3=Cancel  PF5=Send Notice PF6=Begin Search
   PF7=Previous Screen PF8=Next Screen  PF9=File  PF10=Add One Line

FIG. 3C

RECONCILE CALENDARS
    DELETED ENTRIES WILL BE DELETED OF FLAGGED
    OLD ENTRIES WILL COEXIST WITH NEW ENTRIES UNTIL EDITED
    NEW ENTRIES WILL COEXIST ON MASTER UNTIL EDITED
          Host Calendar Name:_____
          Personal Calendar name:_____
Time Stamp of Personal Copy    DATE DD/MM/YY_____   TIME HH:MM:SS
   RECONCILE Time Span:  Begin Date _____  Begin Time_____
                         End Date _____    End Time_ ____

DELETE ENTRIES ___ (Y/N) Y = Host copy entries without corresponding Personal
copy entries will be deleted. N = Entries will be flagged for viewing.
                         Begin Date _____  Begin Time_____
                         End Date _____    End Time_ ____

REPLACE ENTRIES___(Y/N)  Y = Entries in conflict with different Time Stamps will
be replaced on the Host copy. N = The entries will be flagged for viewing.
                         Begin Date _____  Begin Time_____
                         End Date _____    End Time_ ____

PF1 = Help  PF2 = Cancel  PF4 = Reconcile and return

FIG. 4

METHOD FOR AUTOMATICALLY RECONCILING ENTRIES ON TWO COPIES OF INDEPENDENTLY MAINTAINED ELECTRONIC CALENDARS

FIELD OF INVENTION

This invention relates in general to electronic calendaring methods, and in particular to a calendaring method in which a calendar owner can automatically and interactively reconcile independent entries made within a designated time span on two different copies of his calendar.

CROSS-REFERENCE TO RELATED APPLICATIONS:

1. Co-pending application Ser. No. 008,034 filed concurrently herewith, now U.S. Pat. No. 4,831,552 entitled "Method For Concurrently Displaying Entries From a Plurality of Different Electronic Calendars Based on Interactively Entered Criteria," and assigned to the assignee of the present application is directed to an electronic calendaring method in which a calendar owner can display a set of calendar entries from different calendars which have an interrelationship that the user defines by data that is entered into the system interactively.

2. Co-pending application Ser. No. 008,039 filed concurrently herewith, now U.S. Pat. No. 4,819,191 entitled "Electronic Calendaring Method to Establish Calendar Floating Triggers for Calendared Events and Processes" and assigned to the assignee of this application is directed to an electronic calendaring method in which a calendar owner can selectively trigger a predefined action and response to detecting one or more criteria related to the calendar event that has previously been defined and entered into the system.

3. U.S. Pat. No. 4,807,154, issued Feb. 21, 1989, Ser. No. 008,033 filed concurrently herewith, entitled "Method for Developing Automatic Replies in an Interactive Electronic Calendaring System," and assigned to the assignee of the present application is directed to an electronic calendaring method in which a calendar owner can respond automatically to requests for participation in events being calendared by another person. The nature of the reply is based on an analysis of the parameters set forth in the request and an algorithm employing a set of prioritized criteria that the calendar owner has established to provide the automatic response.

4. U.S. Pat. No. 4,807,155, issued Feb. 21, 1989, Ser. No. 008,036 filed concurrently herewith, entitled "Electronic Calendaring Method for Automatic Confirmation of Resource Availability During Event Calendaring", and assigned to the assignee of this application is directed to an electronic calendaring method in which a calendar owner, when calendaring an event such as a meeting, which requires, in addition to a meeting room, such articles as a projector, video conferencing equipment, etc., automatically receives confirmation that requested articles are available and reserved for the calendared meeting event.

5. Co-pending application Ser. No. 008,238 filed concurrently herewith, now U.S. Pat. No. 4,804,955 entitled "Electronic Calendaring Method Which Provides for Automatic Assignment of Alternates In Requested Events," and assigned to the assignee of this application is directed to an electronic calendaring method in which a calendar owner who receives a request to participate in a calendar even originated by another calendar owner, and currently being calendared by that owner, can establish an automatic response which reflects the assignment of an alternate to the event based on the relationship of the information that accompanies the request and criteria that the calendar owner has pre-established for each potential alternate.

BACKGROUND ART

The prior art has disclosed a number and variety of interactive electronic calendaring systems and method. The objective of all of these systems is primarily to assist the person who, for a number of different reasons, maintains a calendar of future events containing various information about the event at entry points on the calendar which relative to the time of the event.

The increase of personal computers and intelligent workstations in recent years has made it possible for calendar owners to establish and maintain their calendars on these interactive type data processing systems.

Two general types of interactive electronic calendaring systems have thus evolved in the art. In one type of calendaring system, the owner of the calendar is generally also the user of the workstation and that workstation is generally not a part of a larger network. Generally, in these types of systems, the calendar functions involve presenting a screen to the user representing a day calendar divided into a number of time periods or time slots. Each period is capable of displaying a limited amount of text that the user enters. In some systems, the day calendar can scroll vertically to present more time periods to the user or horizontally to present longer text entries. The operator can generally "page" forward or backward and, in most arrangements, can display a requested date. These calendaring methods generally do not limit the type of event that is calendared nor the terminology employed at any of the entry points and, to that extent, function in the same manner as conventional manual calendars or appointment books.

The electronic calendaring method and systems do have an advantage over the prior art manual calendaring of events in that the user generally has the ability to scan a time span involving a large number of days and identify calendared events quite rapidly.

The other type of calendaring arrangement that has developed in the prior art involves multi-user environments having a large number of terminals or workstations which are generally part of a larger communication network. Usually these networks have been established to permit the users to interact with each other and with data maintained on the system. In this environment, a user at a terminal or workstation can send a message to one or more of the other users on the network concurrently, and is notified when the addressees have received and read the message. In most of these environments, each user generally maintains a calendar, and in many of these environments the reason for having a network in which users interact, quite often involves user interaction that requires reference to the respective electronic calendars of the users. A considerable amount of time is therefore spent by calendar users in many organizations, with people checking and rearranging their calendars to accommodate various events such as meetings and presentations.

Calendar systems have progressed to the point where a person who is calling a meeting can at least view the calendars of a number of users that he intends to invite to a meeting, in order to determine a common available time for the meeting. (U.S. Pat. No. 4,676,836 is an example of such a system.) In this prior art system, a screen is presented to the meeting originator which requests the data necessary for the system to determine times that all potential attendees would be available. The data requested includes, for example, the length of the meeting, a time period during which the meeting should be conducted, the place of the meeting and the names of the attendees. Based on this data, the method returns a screen of available times after inspecting each attendee's day calendar during the time period for free time slots or periods.

The originator then selects the beginning time and end time of the meeting, including the time and date, and invitations are automatically sent to all the attendees, requesting their attendance at the scheduled meeting.

While such an automatic system saves time in finding a convenient meeting time, relative to the manual process, the process is limited to the scheduling of meetings based on "free time" as represented by the absence of a calendar entry on each of the inspected calendars. This approach does not recognize that some calendar entries are less important than others and, in practice, it is often impossible to find a common period of "free time" for a meeting that involves a large group of people or a meeting involving a number of people whose work requires a large number of meetings.

These deficiencies of the prior art electronic calendaring methods, namely using only free time to find relevant calendar entries, are overcome by the invention disclosed and claimed in cross-referenced application Ser. No. 008,034 now U.S. Pat. No. 4,831,552.

In accordance with that invention, an electronic calendaring method is provided in which a calendar owner can request the system to display or print out a selected subset of calendar entries from a plurality of calendars maintained by the electronic calendaring system. The method assists the calendar owner in defining the selected subset by presenting to him a "view select" screen containing various prompts to which he responds by keying in the search criteria that he wishes to employ, to determine if a calendar entry belongs to the subset. The subset is then displayed in one or more composite screens. Since criteria other than free time may be employed in defining the selected subset, the "view select" function can be used to provide enhancements to functions such as the automatic scheduling of meetings.

As explained in detail in that application, calendared events that have a lower priority than the event being calendared can be included on the composite calendar so that an event that is calendared can be potentially displaced. If the system also allows a calendar owner to develop responses to invitations automatically based on pre-established criteria and data contained in the invitation, such as described in cross-referenced application Ser. No. 008,033 now U.S. Pat. No. 4,807,154 then it is quite permissible and acceptable for entries to be entered on an owners calendar in his absence.

Most workstations which are connected to a large system allow a calendar owner to make a copy of his calendar in machine readable form so that he can review and modify that copy at another terminal which may be at home or another location. Many individuals therefore make a machine readable copy of their calendar on a diskette which they carry with them when they are away from the office. If these individuals have portable type personal computers then it is a simple matter to update that copy as the need arises when they are away from the office.

While an individual is away from his office there are generally a number of entries that are made, if only on a tentative basis, to the system copy of the calendar. These may be made by an assistant or automatically or both depending on what the calendar owner has arranged to do when he is away from the system. The problem arises that on return to the office the entries on each copy must be reconciled on a manual basis by the calendar owner or an assistant which can sometimes result in a time consuming, error prone, tedious endeavor. The present invention avoids this problem by providing an automatic interactive reconciliation process.

SUMMARY OF THE INVENTION

In accordance with the present invention an electronic calendar method is provided in which a calendar owner can automatically reconcile the entries within a designated time span that have been made independently on two different calendars. In a typical situation the owner obtains a machine readable copy of his calendar that he can update during a planned absence from his office. This copy will be referred to as the personal copy of the calendar while the calendar maintained by the host is referred to as the system copy. During the planned absence his system calendar continues to be updated either by an assistant or automatically by the system. The owner also updates his personal copy by means of his portable computer. On return to the office, the entries on the two calendars are reconciled automatically in accordance with the method of the present invention.

In the preferred embodiment, calendar entries for the electronic calendaring system have predefined categories. In making a calendar entry on the system an owner is presented with a screen which assists in the creation of a calendar entry by requesting certain information which is stored by the system in established data structures. Each entry is assigned a unique ID number and is also time stamped with the time at which the entry is made. The time stamp of an entry should not be confused with the time slot in the calendar where the entry is placed.

In reconciling the entries between the host copy and the personal copy the owner designates one of the copies as the master which will, at the end of the reconciling process, represent that owners current calendar. Generally the host copy is designated the master. The owner must also specify the time span over which the reconciling process should take place. Generally the time span will start at the time the personal copy was made which is recorded on the personal copy and end about the time the reconciling process is started.

The reconcile process takes into consideration the various actions that can be taken relative to the master copy and the personal copy. The following actions are permitted by the electronic calendaring method:
1. Create a new calendar entry on either copy
2. Delete an existing calendar entry on either copy
3. Change the time slot to which a calendar entry is assigned
4. Modify the content of an entry but not the ID The logic of the reconciling process is to first identify the old entries and the new entries. Old entries by definition are entries having a time stamp prior to the time the personal copy was made. New entries by definition are entries made after the time the copy was made and therefore have time stamps which are subsequent to the time the personal copy was made. Old entries that have not been altered in any manner are identified since these will not be changed on the master copy. Each remaining pair of old entries therefore has had one entry one one of the copies either modified or deleted. If an old entry has been deleted on the personal copy it can be assumed that it was intentionally deleted by the owner and therefore that entry is deleted on the system copy. In order for an entry to be deleted from the system copy, the originator of the entry must initiate it, which in the case of meeting type entries may be some other calendar owner on the system. If that is the case, then the reconciling process assumes that is has been correctly deleted and the entry on the personal copy is ignored. The calendar owner is given the option at the time he requests the reconciling operation as to whether entries that are under his control and that were deleted by an assistant should be presented to him for review or should be permanently deleted.

The last set of old entries to be considered are those entries which were modified. By definition a modified old entry pair will have the same IDs and time slots on each copy but the time stamps of the entries will be different. Only two conditions can exist. The first is that one time stamp is prior to the time the copy was made. The second condition is that both time stamps are subsequent to the time the copy was made but since the IDs and time slots were the same the entries were correctly identified as old entries. In the first condition the entry with the time stamp that is subsequent to the copy time prevails and is transferred to the master copy if it is not on the master copy.

The second condition in which both entries have been modified is taken care of by doing a comparison of the various data in each entry to insure that a conflict really exists since it is possible that both entries were updated with the same information at different times in which case there is really no need to take any action on the master copy. If the comparison operation on the data indicates that there are differences but they are not necessarily inconsistent then the data is combined in the entry on the master calendar. An example of a difference that could be considered as not being inconsistent is data in a comment field of a data structure associated with one entry and not in the other entry.

In the event a valid inconsistency is detected both entries are flagged for presentation to the owner for conflict resolution.

The new entries on each copy within the specified time span will be definition have a unique time stamp which is subsequent to the time the copy of the calendar was made. Each new entry on the personal copy is therefore transferred to the master copy at the corresponding time slot. If the time slot is taken by another entry a conflict exists and the entries are flagged for presentation to the calendar owner.

New entries on each copy which were modified present no problem since only one copy of the modified entry exists and it is treated basically as an unmodified new entry. A new entry on the personal copy that was deleted is ignored since it is assumed it was deleted intentionally by the owner. New entries on the master copy that were deleted are treated in the same manner that old deleted entries were treated. Deleted entries under control of other calendar owners are assumed to have been deleted correctly. Deleted entries under the control of the calendar owner are either treated as deleted or presented to the owner, at his option, to ratify or veto the prior deletion.

It is therefore an object of the present invention to provide an improved electronic calendaring method.

A further object of the present invention is to provide an electronic calendaring method in which calendar entries on two different copies of the same calendar can be automatically reconciled.

A still further object of the present invention is to provide an improved electronic calendaring method in which a calendar owner can reconcile independently made calendar entries on two different copies of his calendar.

Another object of the present invention is to provide an electronic calendaring method in which a calendar owner can take a machine readable copy of his calendar that can be updated independently of the original calendar for a period of time and then is assisted in reconciling the entries from both calendars.

Objects and advantages other than those mentioned above will become apparent from the following description when read in connection with the drawing.

DESCRIPTION OF THE DRAWINGS

FIGS. 3a–3c illustrate screens which are employed by the users in calendaring an event.

FIG. 4 illustrates a screen which is employed by a calendar owner to assist in reconciling two different copies of the same calendar for a given time period.

Figure 1:
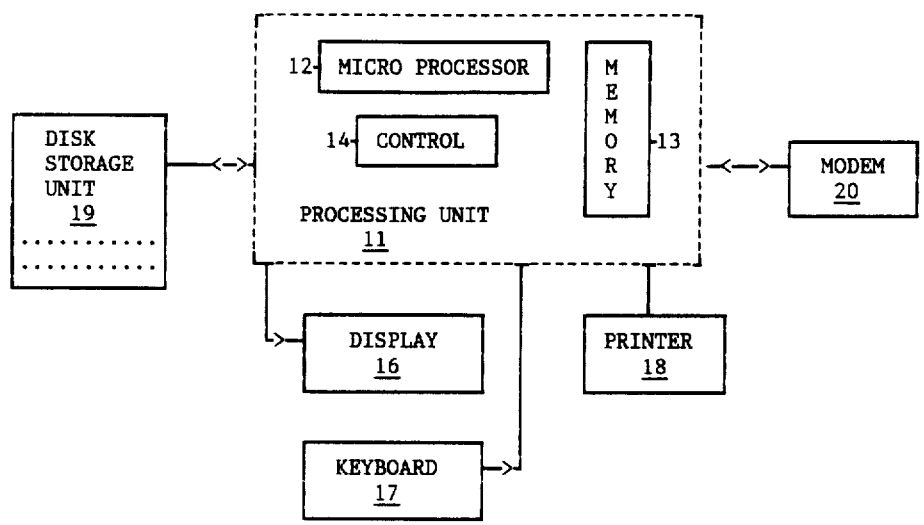
FIG. 1 illustrates an interactive workstation in which the method of the present invention may be advantageously employed.

BRIEF DESCRIPTION OF THE PREFERRED EMBODIMENT:

FIG. 1 illustrates the functional components of an interactive type data processing terminal on which the electronic calendaring method of the present invention may be advantageously employed. The terminal comprises a processing unit 11 which includes a microprocessor block 12, a semiconductor memory 13, and a control block 14 which functions to control input/output operations in addition to the interaction between the micro processor block 12 and the memory unit 13.

The terminal further includes a group of conventional peripheral units including a display device 16, a keyboard 17, a printer 18, a disk storage unit 19, and a modem 20. Since the details of the above described functional blocks form no part of the present invention and can be found in the prior art, only a brief functional description of each block is set forth, along with a description of their interactions, sufficient to provide a person of ordinary skill in the art with a basis of understanding applicants' improved electronic calendaring method.

Processing unit 11 corresponds to the "system unit" of a personal computer system such as the IBM XT or IBM AT type systems. Unit 11 is provided with an operating system program which may be one of the many versions of DOS (Disk Operating System) which is normally employed to run the systems. The operating system program is stored in memory 13 along with one or more application programs that the user has selected to run. Depending on the capacity of memory 13 and the size of the application programs, portions of these programs, as needed, may be transferred to memory 13 from the disk storage unit 19 which may include, for example, a 30 megabyte hard disk drive and a diskette drive. The basic function of the disk storage unit is to store programs and data that are employed by the system and which may readily be transferred to the memory unit 13 when needed. The function of the diskette drive is to provide a removable storage function for entering programs and data into the system, and a vehicle for storing data in a form that is readily transportable for use on other terminals or systems.

Display device 16 and keyboard 17 together provide for the interactive nature of the terminal, in that in normal operation, the interpretation that the system gives to a specific keystroke by the operator depends, in substantionally all situations, on what is being displayed to the operator at that point in time.

In some situations, the operator, by entering commands into the system, causes the system to perform a certain function. In other situations, the system requests the entry of certain data, generally by displaying a prompt type of menu/message screen. The depth of the interaction between the operator and the system varies by the type of operating system and the application program, but is a necessary characteristic of terminals on which the method of the present invention may be employed.

The terminal shown in FIG. 1 further includes a printer 18, which functions to provide hard copy output of data developed or stored in the terminal. Lastly, the modem 20 functions to transfer data from the terminal of FIG. 1 to a host system through one or more communication links which may be a commercial type link or a dedicated communication link.

Figure 2:
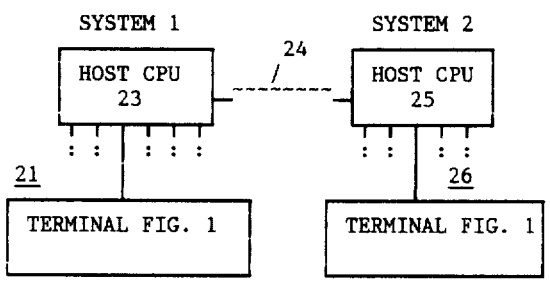
FIG. 2 illustrates a network of interactive workstations of the type shown in FIG. 1.

FIG. 2 illustrates a network 21 of interactive type workstations of the type shown in FIG. 1. As illustrated, the network includes a plurality of terminals which are interconnected with each other and to a host central processing unit 23, which in turn is connected via communication link 24 to a second host processing unit 25, which also connects to another network 26 of interactive workstations. Functionally, the system operates to allow one terminal to communicate to one or more other terminals using established communication protocols, so that the various serially connected communication links are transparent to the operator. Such systems are well known in the art, and are currently in extensive commercial use. Since these communication links per se are not part of the present invention, only those details that are necessary for an understanding of the calendaring method of the present invention will be described. It should therefore be assumed in the following description, that each workstation on the network has a system node address and a "post office" address, and that to simplify the description, there is only one individual assigned to each node on the network. It should further be assumed that conventional communication services are provided by the system, such as directory listings of individual calendar owners and shareable resources such as meeting rooms, etc., which require scheduling.

The system shown in FIG. 2 processes information as various types of data objects such as text data objects, graphic data objects, and calendar data objects. Each of these data objects are represented by a datastream which comprises a series of structured fields.

A calendar object datastream has the following sequence of structures.
Begin Document (BDT)
  Begin Page (BPG)
    Begin Calendar Data (BCL)
      Calendar Data Descriptor (CDD) (Optional)
      Calendar Data SF (CAD)
      Calendar Structures (COCA)
    End Calendar Data (ECL)
  End Page (EPG)
End Document (EDT)

The format of the datastream for other data objects contain the begin document, begin page, end page, and end document data structures. Structured fields corresponding to those listed above for a calendar object are also employed for other type objects.

A structured field is a self-describing entity which contains related groupings of parameter values and triplets. The structure field, as shown below, has two parts: the Structured Field Introducer and the Structured Field Content.

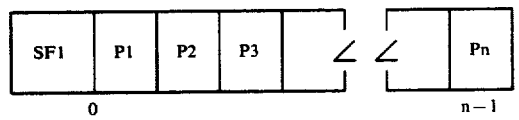

The structured field begins with a Structured Field Introducer. the syntax and semantics of the Structured Field Introducer are defined by the architecture which governs the datastream in which the structured field is found. The Structured Field Introducer contains as the first two bytes a parameter which defines the length of the structured field. It also contains an identification code which uniquely identifies the structured field.

The Structure Content portion of each structured field contains structures and triplets, which give the structured field its meaning. Parameters in the triplets define the attributes of the Calendar Object. Every parameter has a value either explicitly appearing in a triplet, inherited from a control structure in the datastream's hierarchy, or implicitly defined as a default. This default may also be the alternate action value.

Every structure is either required or optional. A required structure appears in the object because the function of that structure is required and for proper performance of the function an actual value is necessary.

An optional structure need not appear in the object either because the function of that structure is not required or because the function is required, but default values are acceptable for all parameters.

As shown above, a calendar data (CAD) structured field (SF) precedes the actual calendar data. A calendar data descriptor (CDD) SF can precede the CAD SF to provide formatting information for the data that follows.

Calendar data comprises named data structures and named triplets which are composed of parameters. A parameter is a variable to which a value is assigned. Parameters can be optional or required. Parameters are also classified as terminal or non-terminal. A terminal parameter is merely the last parameter in a string of parameters.

A parameter can have one of three types of values assigned.

1. NUM - This is a number or a numerical value.
2. COD - This is a code assigned a specific meaning.
3. BST - This is a bit string of binary elements, each of which is usually independent of the other.

In the following discussion it will be assumed that a byte comprises 8 bit positions numbered 0-7 from left to right, with position 0 being the high order position. Bit position 0 represents 27 (2 to the 7th power), while bit 7 represents 20 (2 to the 0 power).

The various calendar structured fields and calendar triplets are defined by the following type of table.

| BYTES | NAME | TYPE | MIN | MAX | LGTH | OPT |
|-------|------|------|-----|-----|------|-----|
| n-m   | name | type | v   | x   | www  |     |

In the figure:

BYTES refers to the position, indexed on zero.

NAME is the name by which reference is made to the parameter.

TYPE denotes the syntax of the parameter by "type," The architected types NUM, COD, and BST were described earlier.

LGTH denotes the length of the field in terms of the exact number of bytes or the maximum number of bytes permitted.

OPT refers to the optionality of the parameter's appearance in the structure or triplet:

O means that the parameter is optional.

R means that the parameter's appearance is required.

If a required parameter is missing, an exception condition exists. The alternate action is to ignore the structure, self-defining field, or triplet to which the missing parameter belongs.

Syntactically descriptive material below the figure indicates what additional restrictions apply to the structure or triplet defined by the figure.

Calendar structures and calendar triplets employed for the various event types which are calendared and other structures which are relevant to the present invention will be described using the above-described format. After the structures are described, the display screens that are presented to calendar owners by the system in order to solicit information when a calendar owner wants to perform a calendaring function will be described. A flow chart setting forth the detailed steps of the method of the present invention will then be described that will assist persons skilled in programming interactive terminals to implement the method of the present invention.

In the preferred embodiment, calendar entries are classified into a number of different types. Since the invention contemplates interchanging calendar data throughout the system, including terminals that are remotely connected, such as those shown in FIG. 2, entry types and presentation language are controlled by a defined architecture.

While the same display screen may be employed to solicit the data for a number of different event types, the data structures and triplets, required or optional, will vary by event type.

While some of the structures to be described and the triplets associated with these structures are not directly involved in the present invention, they have been described in order the provide background for the reader and a basis for a comprehensive understanding of the claimed process and its relationship to the processes described and claimed in the cross-referenced applications.

The various calendar object data structures to be described are preceded by a calendar data structure shown below.

| BYTES | CALENDAR DATA (CAD) STRUCTURE FIELD (SF) | | | | | |
|-------|------|------|------|------|------|-----|
|       | NAME | TYPE | MIN | MAX | LGTH | OPT |
| 0-1   | Structured Field Length | NUM | 8 | 32767 | 2 | R |
| 2     | Structured Field Type1 | COD | X'D3' | X'D3' | 1 | R |
| 3     | Structured Field Type2 | COD | X'EE' | X'EE' | 1 | R |
| 4     | Structured Field Type3 | COD | X'5B' | X'5B' | 1 | R |
| 5     | Flags | BST | 0 | 0 | 1 | R |
| 6-7   | Segment Sequence Number | NUM | 0 | 32767 | 2 | R |
| 8-7+n | Calendar Data | | * | * | n | R |

*Values depend on the Calendar Object structure and triplet specification.

The Calendar Data SF (CAD) identifies the data as calendar data and specified the length of the calendar data. The Calendar Data SF contains, for example, up to 32767 bytes of calendar structures and calendar triplets (called "Calendar Data"). Calendar data varies with the function employed by the generator of the object.

MAJOR CALENDAR STRUCTURES DESCRIPTION

This section describes the major structures that are involved in the present invention. The structures consist of a mixture of calendar triplets. The triplets are described in the Calendar Triplets Description section that follows this section.

The calendar structures are preceded by the Calendar Data structured field (CAD). Parameter values specified by the system can be overridden by parameters specified in calendar data, for example, the Code Page of Symbols for Displaying and Printing Data.

In the structure description, bits are consecutively numbered from left to right starting with zero.

The format for all of the structures is the same. The format is shown below.

| BYTES | NAME | TYPE | MIN | MAX | LGTH | OPT |
|-------|------|------|-----|-----|------|-----|
| 0-1   | LENGTH | NUM |  |  |  | R |
| 2-3   | TYPE | COD |  |  |  | R |
| 4-n   | TRPLT1 to TRPLTn |  |  |  |  | R | where:
LENGTH = A two-byte value of the number of bytes in this structure including byte zero.
TYPE = A two-byte binary number that designates a specific structure function.
TRPLT1 TO TRPLTn = Calendar Structure Triplets.

The length of structures can vary depending on the number of triplets included.

If the length excludes all or part of an optional parameter in a triplet, then the value for that parameter and any parameters that follow are not changed; that is, the LENGTH field is used as specified.

If a structure is invalid or unsupported, an exception is raised.

If the length field excludes a required parameter or triplet, an exception is raised.

If a structure contains an invalid or unsupported parameter or triplet, an exception is raised.

APPOINTMENT (APP) STRUCTURE
The appointment structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'70' | X'70' | 1 | R |
| 4-3+n | Appointment Triplets | * | * | | n | R |

*Values depend on the triplet specification.

The APP structure provides the fields necessary to interchange appointment information, the scheduling of appointments and requests for appointment information.

CALENDAR COMMENTS (CMT) STRUCTURE
The calendar comment structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'75' | X'75' | 1 | R |
| 4-3+n | CMT Triplets | * | * | | n | R |

*Values depend on the triplet specification.

The CMT structure provides the fields necessary to interchange calendar comments. The structure supports calendar comments associated with a date and time and calendar comments not associated with a date and time.

ENTRY SELECT (ENS) STRUCTURE

The calendar comment structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'7F' | X'7F' | 1 | R |
| 4-3+n | ENS Triplets | * | * | | n | R |

*Values depend on the triplet specification.

The ENS structure supports interchange for entries VACATION, HOLIDAY, OFFSITE and NOT NORMAL WORK HOURS calendar comments.

MEETING (MTG) STRUCTURE

The meeting structure is shown below.

| BYTES | NAME | TYPE | MIN. | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'85' | X'85' | 1 | R |
| 4-3+n | Meeting Triplets | * | * | | n | R |

*Values depend on the triplet specification.

The MTG structure provides the fields necessary to interchange meeting information, the scheduling of meetings and requests for meeting information. It also provides a specific search classification to allow building a composite calendar for a specified list of calendar owners.

NAMES LIST (NML) DATA STRUCTURE

The names list data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'8A' | X'8A' | 1 | R |
| 4-3+n | NML Triplets | * | * | | n | R |

*Values depend on the triplet specification.

The NML structure provides the fields to support a name, associated addresses and status. The NML may contain a list of items, such as an invitee's list, by concatenating Name (NME), Address (ADR) and User Status (UST) sequences. The list may include one or more than one name and associated information.

TRIGGER (TGR) STRUCTURE

The Trigger structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'8F' | X'8F' | 1 | R |
| 4-3+n | TGR Triplets | * | * | | n | R |

*Values depend on the triplet specification.

The TGR structure specifies a time that a notification will occur and or a process will begin.

VIEW SELECT (VSL) DATA STRUCTURE

The View Select data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'95' | X'95' | 1 | R |
| 4-3+n | VSL Triplets | * | * | | n | R |

*Values depend on the triplet specification.

The VSL structure provides a way to request calendar views for specific category(s) and timespan(s).

CALENDAR PROFILE (CPL) DATA STRUCTURE

The Calendar Profile data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'77' | X'77' | 1 | R |
| 4-3+n | Calendar Profile Triplets | | * | * | n | R |

*Values depend on the triplet specification.

The CPL structure provides the fields necessary to interchange calendar profile information. The calendar Profile contains information that describes the associated calendar.

DATE AND TIME MAP (DTM) DATA STRUCTURE

The Date and Time Map data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'7A' | X'7A' | 1 | R |
| 4-3+n | DTM Triplets | | * | * | n | R |

The DTM structure provides an efficient way to pass date and time slot usage between calendar users. It is used to build a combination (composite) calendar from Date and Time Map responses from several users. It supports the selection of calendar entry category(s) and timespan(s) for the Date and Time Map requests and responses.

AUTO RESPONSE (ARS) DATA STRUCTURE

The Auto Response data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X'D3' | X'D3' | 1 | R |
| 3 | Structure Type2 | COD | X'72' | X'72' | 1 | R |
| 4-3+n | Auto Response Triplets | | * | * | n | R |

The ARS structure provides the fields necessary to interchange automatic response information. It allows the use of a network address(NAD), A Meeting or Appointment Structure ID (SID), A Priority (UDF) or a User Defined Field (UDF) specification to initiate an automatic response.

CONFERENCE ROOM (CRM) DATA STRUCTURE

The Conference Room data structure is shown below.

| BYTES | NAME | TYPE | MIN | MAX | LGTH | OPT |
|---|---|---|---|---|---|---|
| 0-1 | Structure Length | NUM | * | 32767 | 2 | R |
| 2 | Structure Type1 | COD | X D3' | X D3' | 1 | R |
| 3 | Structure Type2 | COD | X 78' | X 78' | 1 | R |
| 4-3+n | Conference Room Triplets | | * | * | n | R |

The CRM structure provides the fields necessary to interchange conference room information. It contains information describing a conference room.

CALENDAR TRIPLETS DETAIL DESCRIPTION

This section describes in detail the set of calendar triplets that are the building blocks designed to be used by the Calendar Structures of the system including those described in the previous section.

In the triplet descriptions, bits are consecutively numbered from left to right starting with zero.

The format for all of the triplets is the same and is shown below.

| BYTES | NAME | TYPE | MIN | MAX | LGTH | OPT |
|---|---|---|---|---|---|---|
| 0 | LENGTH | NUM | | | | R |
| 1 | KEYWORD | COD | | | | R |
| 2-n | PARM1 to PARMn | | | | | R | where
LENGTH = A one-byte value of the number of bytes in this triplet including byte zero.
KEYWORD = a one-byte binary number that designates a specific triplet function.
PARM1 to PARMn = Parameters containing the triplet settings.

The length of some triplets can vary depending on the number of parameters specified. If the length excludes an optional parameter or part of an optional parameter, then the value for that parameter and any parameters that follow are not changed; that is, the LENGTH field is used as specified. If a triplet is received in which the length exceeds the maximum value required to include all parameters, an exception is raised since the additional values are considered to be unsupported parameters. Also, if the length field excludes a required parameter, an exception is raised.

Since bytes 0 and 1 of all the triplets are identical, they are not shown for each triplet. Only bytes 1 through n will be described.

CAPACITY (CPC) TRIPLET DATA STRUCTURE

The CPC DS is shown below

| BYTES | NAME | TYPE | MIN | MAX | LGTH | OPT |
|---|---|---|---|---|---|---|
| 1 | Keyword | COD | X 17' | X 17' | 1 | R |

| BYTES | NAME | TYPE | MIN | MAX | LGTH | OPT |
|---|---|---|---|---|---|---|
| 2 | Capacity | NUM | 1 | 255 | 1 | R |

The CPC triplet specifies the capacity for an associated identified facility.

CPC Parameters

CAPACITY - Specifies the number of persons accommodated.

Values 1-255

CONFERENCE ROOM EQUIPMENT (CEQ) TRIPLET DATA STRUCTURE

The CEQ data structure is shown below.

| BYTES | NAME | TYPE | MIN | MAX | LGTH | OPT |
|---|---|---|---|---|---|---|
| 1 | Keyword | COD | X 18' | X 18' | 1 | R |
| 2-3 | Equipment | BST | | | 2 | R |

The CEQ triplet specifies the equipment in the conference room.

CEQ Parameter

Equipment - Specifies a specific piece of equipment in the conference room.

| | Bit |
|---|---|
| 0 = | Overhead Projector |
| 1 = | Projection Screen |
| 2 = | Movie Projector |
| 3 = | Slide Projector |
| 4 = | Video Recorder |
| 5 = | Television |
| 6 = | Flip Chart Paper |
| 7 = | Flip Chart Easel |
| 8 = | Display Terminal |
| 9 = | Conference Telephone |
| 10 = | Telephone |
| 11 = | Writing Board |
| 12 | Reserved |
| -31 | |

CALENDAR SCOPE (CSC) TRIPLET DATA STRUCTURE

The CSC DS is shown below.

| BYTES | NAME | TYPE | MIN | MAX | LGTH | OPT |
|---|---|---|---|---|---|---|
| 1 | Keyword | COD | X 10' | X 10' | 1 | R |
| 2-3 | Calendar Begin Day | NUM | 1 | 366 | 2 | R |
| 4-5 | Calendar Begin Year | NUM | -32K | 32767 | 2 | R |
| 6-7 | Calendar End Day | NUM | 1 | 366 | 2 | R |
| 8-9 | Calendar End Year | NUM | -32K | 32767 | 2 | R |

The CSC triplet defines the timespan supported by the calendar.

CSC Parameters

CALENDAR BEGIN DAY - The day of the year that the calendar timespan begins.

CALENDAR BEGIN YEAR - This is the begin year for the timespan supported in the calendar.

CALENDAR END DAY - The day of the year that the calendar timespan ends.

CALENDAR END YEAR - This is the end year for the timespan supported in the calendar.

CALENDAR TYPE (CTP) TRIPLET DATA STRUCTURE

The CTP DS is shown below

| BYTES | NAME | TYPE | MIN | MAX | LGTH | OPT |
|---|---|---|---|---|---|---|
| 1 | Keyword | COD | X 15' | X 15' | 1 | R |
| 2 | Type | NUM | 0 | 5 | 1 | R |

The CTP triplet specifies the calendar type. It is only valid when used in the Calendar Profile. It defines how to present an entire calendar.

CTP Parameters

TYPE - Specifies the calendar type such as Gregorian, Julian, Muhammadan, Jewish, Lunar, Shop.

DATE AND TIME (DTT) TRIPLET DATA STRUCTURES

The DTT DS is shown below.

| BYTES | NAME | TYPE | MIN | MAX | LGTH | OPT |
|---|---|---|---|---|---|---|
| 1 | Keyword | COD | X 1A' | X 1A' | 1 | R |
| 2 | Daylight Saving Indicator | NUM | 0 | 1 | 1 | R |
| 3 | Time Zone Indicator | NUM | -23 | 23 | 1 | R |
| 4-5 | Begin Date Day | NUM | 1 | 366 | 2 | R |
| 6-7 | Begin Date Year | NUM | -32K | 32767 | 2 | R |
| 8-9 | Begin Time | NUM | 0 | 86400 | 3 | R |
| 11-12 | End Date Day | NUM | 1 | 366 | 2 | O |
| 13-14 | End Date Year | NUM | -32K | 32767 | 2 | O |
| 15-17 | End Time | NUM | 0 | 86400 | 3 | O |
| 18-254 | Additional Date/Time Combinations | | | | | |

The DTT triplet specifies the dates and times for the associated triplets in the calendar structure.

DTT Parameters

DAYLIGHT SAVINGS INDICATOR - Specifies Daylight Savings Time is active. This parameter, in conjunction with the Time Zone, identifies the time zone and allows the correct time zone label (i.e., CST or CDT) to be applied to the time.

TIME ZONE INDICATOR - The Time Zone Indicator is the displacement from Greenwich Mean Time (GMT) for the time specified. Values are specified in half hours from GMT to handle half-hour zones.

BEGIN DATE DAY - The day of the year when the event begins. BEGIN DATE YEAR - The year the event begins. BEGIN TIME - Begin Time specifies the event start time in seconds. END DATE DAY - The day of the year when the event ends. END DATE YEAR - The year the event ends. END TIME - End Time specifies the event stop time in seconds.

Date is specified as a combination of two, two byte parameters (day of the year and year). Time is local time in seconds beginning at midnight. One Begin Date and Begin Time is required in each DTT triplet. The Begin and End, Date and Time sequence may be repeated if additional being and end date and being and end times are needed.

If more dates and times then can be sent in one DTT triplet are needed, additional DTT triplets can be included in the Calendar Structure. The only restriction is the byte structure length.

DETAIL (DTL) DATA STRUCTURE

The DTL DS is as follows.

| BYTES | NAME | TYPE | MIN | MAX | LGTH | OPT |
|---|---|---|---|---|---|---|
| 1 | Keyword | COD | X 1F' | X 1F' | 1 | R |
| 2-1+n | Character String | COD | * | * | n | R |

The DTL triplet contains character data in the active or selected code page.

DTL Parameters

CHARACTER STRING - Text information associated with a calendar entry.

If the CGCSGID (SCG) is changed in a character string, the DTL triplet must be ended and another one built.

ENTRY CATEGORY (ECT) DATA STRUCTURE

The ECT DS is shown below.

| BYTES | NAME | TYPE | MIN | MAX | LGTH | OPT |
|---|---|---|---|---|---|---|
| 1 | Keyword | COD | X 25' | X 25' | 1 | R |
| 2-5 | Category | BST | | | 4 | R |

The ECT triplet provides a specific category for unavailable time and for open time on a calendar. The ECT triplet is used to specify calendar entry category(s) in requests and replies for both the Date and Time Map (DTM) and the View Select (VSL) structures.

ECT Parameter

CATEGORY - A four byte, bit encoded value. Combinations of more than one category bit are allowed. The categories provide both request and response categories for both Date and Time Map (DTM) and View Select (VSL) calendar structures. Bits 0 through 20 may be used for both DTM and VSL categories. Bits 21 through 24 are used in View Select only. If they are used in a Date and Time Map, they are ignored.

BIT SIGNIFICANCE ENCODING

0 = Holiday (General) - The owner will work on this holiday.

1 = Holiday (Confirmed) - A confirmed calendar owner holiday.

2 = Holiday (Tentative) - A tentative calendar owner holiday.

3 = Vacation (Confirmed) - Confirmed calendar owner vacation.

4 = Offsite (Confirmed) - The calendar owner will not be at the

5 = Offsite (Confirmed) - The calender owner will not be at the normal work location and will not be available.

6 = Offsite (Tentative) - The calendar ownder has tentatively scheduled an activity away from the nornal work location.

7 = Not Normal Work Hours. - Categorizes hours that are not normally worked.

8 = Confirmed Meetings (Not Attended) = The calendar owner will not attend.

9 = Confirmed Meetings (Attended) - The calendar owner will attend.

10 = Confirmed Meetings (May Attend) - The calendar owner's status for this meeting is tentative.

11 = Tentative Meetings (not Attended) - The calendar owner will not attend.

12 = Tentative Meetings (Attended) - The calendar owner will attend this meeting if it becomes confirmed.

13 = Tentative Meetings (May Attend) - The calendar owner's status for this meeting is tentative.

14 = Confirmed Appointments (Not Attended) - The calendar owner will not attend.

15 = Confirmed Appointments (Attended) - The calendar owner will attend.

16 = Confirmed Appointments (May Attend) - The calendar owner's status for this appointment is tentative.

17 = Tentative Appointments (Not Attended) - The calendar owner will not attend.

18 = Tentative Appointments (Attended) - The calendar owner will attend this appointment if it becomes confirmed.

19 = Tentative Appointments (May Attend) - The calendar owner's status for this appointment is tentative.

20 = Non-Scheduled Time - Identifies open time on the calendar. This category is most effective if used alone.

21 = Date and Time Only (VIEW SELECT ONLY) - Selects date and time for all categories not specifically requested in a View Select.

22 = Private Entry (VIEW SELECT ONLY) - Only date and time may be provided in the response to a calendar View Select request.

23 = Calendar Comments (VIEW SELECT ONLY) - Character data entries.

24 = Triggers (VIEW SELECT ONLY) - Entries that start a process and/or notify.

25 - 31 = Reserved

If all Category bits are set to one in a request for a Date and Time Map, the information returned is meaningless because it includes both scheduled and non-scheduled time. The "NonScheduled Time" bit should be used carefully if it is used with other bits to obtain meaningful data. The "Not Normal Work Hours" bit should also be used carefully for similar reasons.

ENTRY CLASSIFICATION (ENC) DATA STRUCTURES

The ENC DS is as follows

| BYTES | NAME | TYPE | MIN | MAX | LGTH | OPT |
|---|---|---|---|---|---|---|
| 1 | Keyword | COD | X 2A' | X 2A' | 1 | R |
| 2-3 | Classification | BST | | | 2 | R |

The ENC triplet provides a specific Classification code for a calendar entry that occupies a block of time.

ENC Parameters

CLASSIFICATION - A two byte bit encoded value. Combinations of more than one Classification Bit are not allowed.

BIT SIGNIFICANCE ENCODING

0=Holiday - (General) The owner will work on this holiday.
1=Holiday - (Confirmed) A confirmed calendar owner holiday.
2=Holiday - (Tentative) A tentative calendar owner holiday.
3=Vacation - (Confirmed) Confirmed calendar owner vacation.
4=Vacation - (Tentative) Tentative calendar owner vacation.
5=Offsite - (Confirmed) The calendar owner will not be at the normal work location and will not be available.
6=Offsite - (Tentative) The calendar owner has tentatively scheduled an activity away from the normal work location.
7=Not Normal Work Hours - Identifies times that the calendar owner is normally not at work.

ENTRY SECURITY LEVEL (ESL) STRUCTURE

The ESL DS is as follows

| BYTES | NAME | TYPE | MIN | MAX | LGTH | OPT |
|---|---|---|---|---|---|---|
| 1 | Keyword | COD | X 2F' | X 2F' | 1 | R |
| 2 | Security | NUM | | | 1 | R |

The ESL triplet controls the view access for calendar entries. It is supplied by the calendar owner.

ESL Parameter

SECURITY - A one byte value from 0 to 2.
0=Public (DEFAULT) The calendar may be viewed by any calendar user
1=Shared - The calendar may be shared by a selected group.
2=Private - Date and Time can be viewed but not associated calendar data.

ERROR ACTION (EAC) DATA STRUCTURE

The EAC DS is as follows.

| BYTES | NAME | TYPE | MIN | MAX | LGTH | OPT |
|---|---|---|---|---|---|---|
| 1 | Keyword | COD | X 35' | X 35' | 1 | R |
| 2 | Action | BST | | | 1 | R |

The EAC triplet specifies the action required when an exception is processed.

EAC Parameter

ACTION - The error action specification.

BIT SIGNIFICANCE ENCODING

BIT

0=0 - (DEFAULT) Report the exception, take the specified alternate action and continue.
0 1 - Ignore the exception, take the specified alternate action and continue.
1 - 7 Reserved.

EVENT STATUS (EVS) DATA STRUCTURE

The EVS DS is as follows.

| BYTES | NAME | TYPE | MIN | MAX | LGTH | OPT |
|---|---|---|---|---|---|---|
| 1 | Keyword | COD | X 3A' | X 3A' | 1 | R |
| 2 | Event Status | BST | | | 1 | R |

The EVS triplet provides status for an event such as an appointment or meeting.

EVS Parameter

EVENT STATUS - The status of an event.

BIT SIGNIFICANCE ENCODING

0=Confirmed (the meeting time has been established)
1=Tentative (the meeting is tentative)
2=Cancelled (the meeting was cancelled)
3=Postponed (the new date and time are not set)
4=Rescheduled (the meeting has been rescheduled)
5=Marked for Archive (entry will be saved for reference)

NAME (NME) DATA STRUCTURE

The NME DS is as follows.

| BYTES | NAME | TYPE | MIN | MAX | LGTH | OPT |
|---|---|---|---|---|---|---|
| 1 | Keyword | COD | X 3F' | X 3F' | 1 | R |
| 2 | Name Type | BST | | | 1 | R |
| 3 | Associated Triplets | BST | * | * | 1 | R |
| 4-n | Item Name | COD | * | * | 1-251 | R |

The NME triplet specifies a name of either a person or a calendar.

NME Parameters

NAME TYPE - Specifies the name type. Bits 1 and 2 are mutually exclusive. Only one of these bits may be set to 1.

BIT SIGNIFICANCE ENCODING

0=(0- name is a personal name). (1- Name is a calendar name).
1=1- Name is a primitive name not unique in a network
2=1- Name is a descriptive name unique in a network).
3 - 7=Reserved ASSOCIATED TRIPLETS - Bits set to 1 specify that User Status (UST), Network Address (NAD) and Postal Address (PAD) triplets may follow the NME triplet in any order.

0=A User Status (UST) triplet follows that specifies the named items role and status.

1=An Network Address (NAD) triplet follows that specifies the named item's network address(es).

2=A Postal Address (PAD) triplet follows that specifies the named item's postal address(es)

ITEM NAME - Specifies the name of a person or calendar. Values are valid characters in the active or selected code page. The maximum name size is 251 bytes.

The item named by the NME triplet may be further identified using the user Status (UST), the Postal Address (PAD) and the Network Address (NAD) triplets.

The NME triplet must be preceded with an SCG triplet if the characters used are not on the active code page.

NAMES LIST TYPE (NLT) DATA STRUCTURE

The NLT DS is as follows.

| BYTES | NAME | TYPE | MIN | MAX | LGTH | OPT |
|---|---|---|---|---|---|---|
| 1 | Keyword | COD | X 45' | X 45' | 1 | R |
| 2-3 | List Type | BST | | | 2 | R |

The NLT triplet specifies the type of data contained in a list.

NLT Parameter

LIST TYPE - Specifies the list type. Combinations of bits are allowed.

BIT SIGNIFICANCE ENCODING

0=The list contains names and associated Network Addresses.

1=The list contains Nicknames and associated network addresses.

2 - 15 Reserved.

The lists may optionally contain postal addresses and user status. The NLT triplet describes the list contents for specific list types. Lists containing the NLT are constrained to the specified contents. If the NLT is omitted the lists may contain any valid combination of names, user status and addresses.

NETWORK ADDRESS (NAD) TRIPLET DATA STRUCTURE

The NAD triplet data structure is shown below.

| BYTES | NAME | TYPE | MIN | MAX | LGTH | OPT |
|---|---|---|---|---|---|---|
| 1 | Keyword | COD | X 4A' | X 4A' | 1 | R |
| 2-n | Network Address | COD | * | * | 16 | O |

The NAD triplet provides the network Address for the item named in the (NME) triplet. The NAD Parameters include, NETWORK ADDRESS - This is the person's Network Address. Bytes 2 through 9=USER ID BYTES 10 through 17=NODE ID

PLACE (PLC) DATA STRUCTURE

The PLC DS is as follows:

| BYTES | NAME | TYPE | MIN | MAX | LGTH | OPT |
|---|---|---|---|---|---|---|
| 1 | | COD | X 4F' | X 4F' | 1 | R |
| 2-n | Location | COD | * | * | 1-251 | R |

The PLC triplet specifies a location for an event such as a meeting or appointment. The location is described using text characters. The maximum location length is limited to 253 text bytes.

PLC Parameters

LOCATION - Location specifies the event location.

POSTAL ADDRESS (PAD) TRIPLET DATA STRUCTURE

The PAD triplet data structure is shown below.

| BYTES | NAME | TYPE | MIN | MAX | LGTH | OPT |
|---|---|---|---|---|---|---|
| 1 | Keyword | COD | X 55' | X 55' | 1 | R |
| 2-n | Postal Address | COD | * | * | 1-253 | R |

The PAD triplet provides the Postal Address for the item named in the (NME) triplet.

The PAD Parameters include, POSTAL ADDRESS - This is the person's Postal Address. Valid values are valid characters in the active or selected code page.

PROCESS ID (PRD) TRIPLET DATA STRUCTURE

The PRD triplet data structure is shown below.

| BYTES | NAME | TYPE | MIN | MAX | LGTH | OPT |
|---|---|---|---|---|---|---|
| 1 | Keyword | COD | X 5A' | X 5A' | 1 | R |
| 2-n | Process | COD | * | * | 1-16 | R |

The PRD triplet specifies the ID of a process such as a computer program.

PRD Parameter

PROCESS - A 1 to 16 byte identifier. Valid values are valid characters in the active or selected code page.

RESPONSE (RSP) DATA STRUCTURE

The RSP DS is as follows:

| BYTES | NAME | TYPE | MIN | MAX | LGTH | OPT |
|---|---|---|---|---|---|---|
| 1 | Keyword | COD | X 5C' | X 5C' | 1 | R |
| 2 | Response | BST | | | 1 | R |

The RSP triplet establishes a response that will be sent automatically as part of the AUTO RESPONSE data structure.

RSP Parameter

RESPONSE- Specifies what response will be sent. The Alternate indication may use any other bit

BIT SIGNIFICANCE ENCODING

0=No Action - Auto response is deactivated.

1=Confirmed - The invitee will attend.

2=Tentative - The invitee may attend.

3=Not Attending - The invitee will not attend.

4=User Acknowledge - The schedule request was received.

5=Alternate - The response is from the invitee's alternate.

RSVP (RVP) DATA STRUCTURE

The RVP DS is as follows:

| BYTES | NAME    | TYPE | MIN   | MAX   | LGTH | OPT |
|-------|---------|------|-------|-------|------|-----|
| 1     | Keyword | COD  | X '5F'| X '5F'| 1    | R   |
| 2     | RSVP    | BST  |       |       | 1    | R   |

The RVP triplet indicates that an attendance response is required.

RVP Parameter

RSVP - Specifies the need for a response to a meeting schedule request.

BIT SIGNIFICANCE ENCODING

0=No attendance response is required.
1=An attendance response is required using the NML structure.

SET CODED GRAPHIC CHARACTER SET GLOBAL ID (SCG) DATA STRUCTURE

The SCG DS is as follows:

| BYTES | NAME    | TYPE | MIN   | MAX   | LGTH | OPT |
|-------|---------|------|-------|-------|------|-----|
| 1     | Keyword | COD  | X '65'| X '65'| 1    | R   |
| 2-3   | GCSGID  | NUM  | 1     | 65534 | 2    | R   |
| 4-5   | CPGID   | NUM  | 1     | 65534 | 2    | R   |

The SCG triplet specifies the coded graphic character set global identification that is used to map subsequent text into presentable graphics.

The CGCSGID that is specified by the system selects the active Character Set and Code page. If the CGCSGID is not specified the default Character Set and Code page specified are used.

SCG Parameters

CGCSGID - Coded Graphic Character set Global ID; a concatenation of 2 two-byte numbers. The first two bytes identify the Graphic Character Set Global ID (CGSGID) expressed as a binary value. The second two bytes identify the Code Page Global ID (CPGID) expressed as a binary value.
GCSGID - Graphic Character Set Global ID.
CPGID - Code Page Global ID.
GCSGID and CPGID are used to determine how coded text characters are translated to the graphic characters to be presented.

The SCG will only select a code page for the triplet that immediately follows it. If structures containing text characters on a code page that is different from the default code page are concatenated, a separate SCG is required preceding each structure.

The SCG has no affect on the NETWORK ADDRESS in the UDF triplet and the USER CODE in the UDF triplet.

STRUCTURE ID (SID) DATA STRUCTURE

The SID DS is as follows:

| BYTES | NAME       | TYPE | MIN | MAX | LGTH | OPT |
|-------|------------|------|-----|-----|------|-----|
| 1     | Keyword    | COD  | X ' | X ' | 1    | R   |
| 2     | ID Type    | BST  |     |     | 1    | R   |
| 3-n   | Identifier | COD  | *   | *   | n    | R   |

The SID triplet provides an identifier for calendar structures.

SID Parameters

ID TYPE - Specifies the ID type

BIT SIGNIFICANCE ENCODING

0=Entry ID - Identifies a calendar entry
1=Names List ID - Identifies a list of names
2=Trigger ID - Identifies a trigger
3=Profile ID - Identifies a calendar profile
4=Auto Response - Identifies an automatic response IDENTIFIER - 1 to 44 character identifier.

The SID provides a correlation ID to accomplish calendar updates from an intelligent workstation to a host, to correlate responses to a meeting notice with the meeting names list and to correlate notification of a list of people associated with a meeting or a list.

SUBJECT (SBJ) DATA STRUCTURE

The SBJ DS is as follows:

| BYTES | NAME             | TYPE | MIN   | MAX   | LGTH   | OPT |
|-------|------------------|------|-------|-------|--------|-----|
| 1     | Keyword          | COD  | X '6F'| X '6F'| 1      | R   |
| 2-n   | Event Subject    | COD  | *     | *     | 1-253  | R   |

The SBJ triplet specifies the subject for an event. The subject is described using text character.
SBJ Parameters
EVENT SUBJECT - This parameter specifies the event subject Trigger Type (TTP) DATA STRUCTURE The TTP DS is as follows:

| BYTES | NAME    | TYPE | MIN   | MAX   | LGTH | OPT |
|-------|---------|------|-------|-------|------|-----|
| 1     | Keyword | COD  | X '7F'| X '7F'| 1    | R   |
| 2-n   | Type    | BST  | *     | *     | 1    | R   |

The TTP triplet provides a trigger type for use in the Trigger (TGR) structure. The type may be used to activate the correct support program when a trigger structure is processed.

TTP Parameters

TYPE - This parameter specifies whether the type is a message, audio tone process or a combination trigger.

Bit

0=Message trigger (Default)
1=Audio Trigger
2=Process Trigger - The process is identified by the Process ID will be started.
3-7=Reserved

TIME MAP (TMA) DATA STRUCTURE

The TMA DS is as follows:

| BYTES | NAME         | TYPE | MIN   | MAX   | LGTH   | OPT |
|-------|--------------|------|-------|-------|--------|-----|
| 1     | Keyword      | COD  | X '75'| X '75'| 1      | R   |
| 2-4   | Time Scale   | NUM  | 1     | 86400 | 2      | R   |
| 5-n   | Time Byte(s) | BST  |       |       | 1-250  | R   |

The TMA triplet provides the time scale and the bit map representation of the selected time scale, The TMA is used in the DATE and TIME MAP data structure.

TMA Parameters

Time Byte(s) - The time scale is the time increment represented by each bit in the Time Byte(s).

Values allowed are 1 to 86400 seconds. Time Byte(s) - Each bit location in the Time Byte represents a time span equal to the Time Scale. Bit zero represents the timespan beginning at the Begin Time.

TIME STAMP (TMS) DATA STRUCTURE

The TIMS DS is as follows.

| BYTES | NAME | TYPE | MIN | MAX | LGTH | OPT |
|---|---|---|---|---|---|---|
| 1 | Keyword | COD | X 7A' | X 7A' | 1 | R |
| 2 | Daylight Savings Indicator | NUM | 0 | 1 | 1 | R |
| 3 | Time Zone Indicator | NUM | −23 | 23 | 1 | R |
| 4–5 | Begin Date Day | NUM | 1 | 366 | 2 | R |
| 6–7 | Begin Date Year | NUM | −32K | 32767 | 2 | R |
| 8–10 | Begin Time | NUM | 0 | 86400 | 3 | R |
| 11 | Network Address Length | NUM | 0 | 128 | 1 | 0 |
| 12–n | Network Address | COD | | | ~128 | 0 |

The TMS triplet specifies an entry's time zone, creation date and time and the entry creator's network address.

TMS Parameters

DAYLIGHT SAVINGS INDICATOR - Specifies Daylight Savings Time is active. This parameter, in conjunction with the Time Zone, identifies the time zone and allows the correct time zone label (i.e.,. CST or CDT) to be applied to the time.

TIME ZONE INDICATOR - The Time Zone Indicator is the displacement from Greenwich Mean Time (GMT) for the time specified. Values are specified in half hours from GMT to handle half hour zones.

BEING DATE YEAR - The year the event begins. BEGIN TIME - Begin Time specifies the event start time. NETWORK ADDRESS LENGTH - The Network Address length NETWORK ADDRESS - System address Bytes 12 thru 19=USER ID - valid characters in CP256, CS930.

Bytes 20 thru 27=NODE ID - valid characters in CP256, CS930.

Bytes 28 thru 139=Reserved to support additional address.

USER STATUS (UST) DATA STRUCTURE

The UST DS is as follows:

| BYTES | NAME | TYPE | MIN | MAX | LGTH | OPT |
|---|---|---|---|---|---|---|
| 1 | Keyword | COD | X 8A' | X 8A' | 1 | R |
| 2 | Role | COD | 0 | 7 | 1 | R |
| 3 | Personal Status | COD | 0 | 5 | 1 | R |

The UST triplet provides information regarding the person named in the name (NME) triplet. It provides the named persons Role and Personal Status.

UST Parameters

ROLE - Specifies the persons role regarding the event.

VALUES

0 = Caller - Person has called the event.
1 = Arranger - Person is arranging the event.
2 = Invitee (Default) - Person has been invited to the event.
3 = Mandatory Invitee - Person who must attend the meeting.
4 = Alternate - Person replacing an invitee for attendance consideration on a temporary basis.
5 = Additional Attendee - Person who is adding themselves to the distribution list associated with a group meeting.
6 = Receives Copy - Person who receives event information.
7 = Receives Blind Copy - Person who receives event information. only, whose name will not appear on the distribution list.
8 = Permanent Alternate - Person replacing the invitee for attendance on a permanent basis.

PERSONAL STATUS - The status associated with the name.

VALUES

0 = No Action (no status has been received)
1 = Confirmed (the person will attend)
2 = Tentative (the person might attend)
3 = Not Attending (the person will not attend)
4 = User Acknowledge (received the invitation)
5 = Alternate (the invitee will not attend, but an alternate may)

USER DEFINED FIELD (UDF) DATA STRUCTURE

The UDF DS is as follows:

| BYTES | NAME | TYPE | MIN | MAX | LGTH | OPT |
|---|---|---|---|---|---|---|
| 1 | Keyword | COD | X 85' | X 85' | 1 | R |
| 2 | Priority | NUM | 1 | 10 | 1 | R |
| 2–9 | User Code | COD | * | * | 1–8 | R |

The UDF triplet provides a priority and user defined field that is assigned by the calendar owner. The assigned code provides additional entry categories.

UDF Parameters

PRIORITY - A one byte field that specifies a priority value for a calendar entry. 1 is the highest and 10 is the lowest priority.

USER CODE - An eight byte user defined code.

WORK TIMES (WTM) DATA STRUCTURE

The WTM DS is as follows:

| BYTES | NAME | TYPE | MIN | MAX | LGTH | OPT |
|---|---|---|---|---|---|---|
| 1 | Keyword | COD | X 8F' | X 8F' | 1 | R |
| 2 | Daylight Savings Indicator | NUM | 0 | 1 | 1 | R |
| 3 | Time Zone Indicator | NUM | −23 | 23 | 1 | R |
| 4–6 | Begin Time | NUM | 0 | 86400 | 3 | R |
| 7–9 | End Time | NUM | 0 | 86400 | 3 | R |
| 10–254 | Additional Begin/End Time Combinations | | | | | |

The WTM triplet specifies the work times for an associated calendar. Time is local time in seconds beginning at midnight.

WTM Parameters

DAYLIGHT SAVINGS INDICATOR - Specifies Daylight8 Savings Time is active. This parameter, in conjunction with the Time Zone, identifies the time zone and allows the correct time zone label (i.e., CST or CDT) to be applied to the time.

TIME ZONE INDICATOR - The Time Zone Indicator is the displacement from Greenwich mean Time (GMT) for the time specified. Values are specified in half hours from GMT to handle half hour zones.

BEGIN TIME - Begin Time specifies the time block being in seconds.

END TIME - End Time specifies the time block end in seconds.

One Begin Time and End Time is required in each WTM triplet. The Begin and End Time sequence may be repeated if additional being and end times are needed.

WORK WEEK PATTERN (WWP) DATA STRUCTURE

The WWP Data Structure is as follows

| BYTES | NAME | TYPE | MIN | MAX | LGTH | OPT |
|---|---|---|---|---|---|---|
| 1 | Keyword | COD | X 95' | X 95' | 1 | R |

-continued

| BYTES | NAME | TYPE | MIN | MAX | LGTH | OPT |
|---|---|---|---|---|---|---|
| 2 | Pattern | BST | * | * | 1 | R |

The WWP triplet specifies which days of the week are work days. Each bit that is on specifies that the day is a work day.

WWP Parameters

PATTERN - This parameter specifies days of the week.
0 = Sunday
1 = Monday
2 = Tuesday
3 = Wednesday
4 = Thursday
5 = Friday
6 = Saturday
7 = Reserved Table 1 on the next page summarizes the relationships of the triplets to the major Data structures. In the table the letter O indicates that the triplet is optional for that data structure, the letter R' indicates that the triplet is Required for the data structure and the designation '-' indicates that the triplet is not applicable to the data structure.

TABLE 1

| MAJOR STRUCTURES TRIPLETS | | APT | CMT | ENS | MTG | NML | TGR | VSL | CPL | DTM | ARS | CRM |
|---|---|---|---|---|---|---|---|---|---|---|---|---|
| Capacity | CPC | — | — | — | — | — | — | — | — | — | — | O |
| Con. Room Equip. | CEQ | — | — | — | — | — | — | — | — | — | — | O |
| Calendar Scope | CSC | — | — | — | — | — | — | O | — | — | — | — |
| Calendar Type | CTP | — | — | — | — | — | — | O | — | — | — | — |
| Date and Time | DTT | R | O | R | R | R | R | O | — | R | — | R |
| Detail | DTL | O | O | O | O | O | O | — | — | — | — | O |
| Entry Category | ECT | — | — | — | — | — | — | O | — | O | — | — |
| Entry Class. | ENC | — | — | R | — | — | — | — | — | — | — | — |
| Entry Security | ESL | O | O | O | O | O | O | — | O | — | O | — |
| Error Action | EAC | O | O | O | O | O | O | O | O | O | O | O |
| Event Status | EVS | O | — | — | O | — | — | — | — | — | — | — |
| Name | NME | O | — | — | O | O | — | — | O | — | O | O |
| Names List Type | NLT | — | — | — | — | O | — | — | — | — | — | — |
| Network Address | NAD | O | — | — | O | O | — | — | O | — | O | O |
| Place | PLC | O | — | — | O | — | — | — | — | — | — | — |
| Postal Address | PAD | O | — | — | O | O | — | — | O | — | O | O |
| Process ID | PRD | — | — | — | — | — | O | — | — | — | — | — |
| Response | RSP | — | — | — | — | — | — | — | — | — | R | — |
| RSVP | RVP | — | — | — | O | — | — | — | — | — | R | — |
| Set Char. Set | SCG | O | O | O | O | O | O | — | O | — | O | O |
| Structure Id | SID | R | R | R | R | R | R | — | R | R | R | R |
| Subject | SUB | O | — | — | O | O | — | — | — | — | — | — |
| Trigger Type | TTP | — | — | — | — | — | R | — | — | — | — | — |
| Time Map | TMA | — | — | — | — | — | — | — | — | O | — | — |
| Time Stamp | TMS | O | O | O | O | O | O | — | O | — | O | O |
| User Status | UST | O | — | — | O | O | — | — | — | — | O | — |
| User Defined Fld | UDF | O | O | O | O | — | — | — | — | — | O | — |
| Work Time | WTM | — | — | — | — | — | — | — | O | — | — | — |
| Work Week | WWP | — | — | — | — | — | — | — | O | — | — | — |

THE PROCESS OF CALENDARING EVENT

FIG. 3b is a screen that is displayed to the operator/calendar owner in response to the operator indicating to the system that he wants to calendar an event. This can be accomplished, for example, by selecting item 1 from the master menu shown in FIG. 3a. Assume that a meeting is scheduled at 10 a.m. on Thursday, Oct. 7, 1986, and that the notice for the meeting is to be issued through the electronic calendaring system. The owner then enters the information into the system, employing the screens of FIGS. 3b and 3c. To identify the event type after selecting option 1 on screen 3b, the operator merely presses the enter key since the cursor has automatically been positioned at the event e.g., "Meeting" on the screen of FIG. 3b. The next data entry as shown involves assigning a priority to this event. The valued to be entered is a value from 1-10 as indicated on the line following the blank for the value. The function of the priority number is to establish the relative importance of this event when viewed with regard to other commitments which are either planned or anticipated. This entry of a priority value is optional since the system will establish a default priority for the event according to some predetermined criteria which has been established for all calendar owners or alternately which gives a unique default for each specific individual.

The assignment of a priority value to a calendar event either explicitly by the calendar owner or implicitly by the system is a necessary step in the view select process implementing in accordance with the method described and claimed in cross reference application serial number (AT9-86-046). The function of the priority value is described in detail in that application.

The user defined field, as shown in FIG. 3b is not used in the present example. Its function is to provide a field which the user or the user community can employ for some predefined purpose. The event identifier is the official name of the meeting. The date and time of the meeting are entered next.

The next entry on the screen is the names list. All the persons that are invited to attend the meeting have been listed in a names list along with their user ID, network and/or postal addresses and that list is assigned a name. The information is stored in the Names List data structure described earlier so that in the case of regularly scheduled meetings, the meeting caller only needs to identify the name of the names list.

The next entry is the the name of the person calling the meeting. The last two entries are to identify the subject of the meeting and its physical location, such as a conference room.

FIG. 3c is the last screen employed in calendaring an event. This screen allows an event to be assigned a security classification and to indicate if the meeting is tentative or confirmed. The remaining portion of the screen shown in FIG. 3c is for establishing a trigger reminder for the event which is the subject matter of cross reference application serial number (AT9-86-046).

After all the data is entered defining the event, the calendar owner advises the system to send the meeting information that has just been entered to each of the individuals listed in the names lists. This is done in the example shown by keying the program function key PF5.

The data defining the meeting particulars that were entered into the system is stored in the appropriate data structures and triplets described earlier. These data structures are transmitted to each invitee on the system in accordance with the protocols established for the calendaring system and the inner-system communication protocols that can accommodate data interchange between two different calendaring systems.

The invitee calendar owner is required to respond to the meeting notice since every meeting notice contains an RVP triplet indicating that a response is required.

If the invitee/owner has not established an automatic response for this notice, then the response must be entered manually. Any of the prior art methods for manually responding to a meeting notice by the invitee may be employed. For example, the screen employed for calendaring an event or one similar to that screen, may be presented to the invitee with the program function key programmed to enter the invitees' response. Alternately a special screen can be presented providing a response field for the event. The response that is entered is stored in the Personal Status field of the User Status triplet that is associated with the invitees' name in the names list. That data structure is returned to the meeting caller and stored in the names list data structure for the identified meeting.

Other calendar entries are entered in a similar manner with the appropriate screens being presented to the owner in response to one of the event types being selected on screen 3b. The data that is entered into the system is stored in the corresponding data structures discussed earlier.

It can be assumed in the following description that a calendar owner has an electronic calendar that is resident on the host CPU of the system of FIG. 2 and that the host is always online even though the terminals may not be. The calendar of the owner is therefore available to other calendar owners on the system, some of who may be permitted by the owner to actually schedule confirmed meeting and appointments in accordance with the method set forth in cross-referenced application Serial no. (AT9-86-044).

It can also be assumed that the owner has made a copy of his calendar covering the next two months on a diskette and has just returned from a two week business trip during which he updated the machine readable diskette copy with a number of events by means of his portable personal computer. This copy of his calendar will be referred to as his Personal copy. It contains a Copy Time Stamp indicating the date and hour that the copy was actually made. The copy of the calendar on the system will be referred to as the Host copy. Calendar entries that are time stamped prior to the Copy Time Stamp are called old entries. Entries that are made to either copy after the Copy Time Stamp are called New entries.

It should also be assumed that in his absence the Host copy of his electronic calendar was also updated. The term update is intended to include the creation of new events, the modification of existing events, the deletion of existing events, and the moving of an event from one time slot to another which is a combined deletion and creation operation.

The process of reconciling the entries on the two calendars will now be explained with reference to the user interface screen of FIG. 4 and the flow chart of FIG. 5.

With reference to FIG. 4, which illustrates the screen that is presented to the owner in response to the selection of option 5 on the master menu of FIG. 3a. The operator is asked to identify the names of the calendars that will be involved in the reconciliation process. The Permanent Calendar's name is the calendar that will reflect owners current calendar at the end of the reconciliation process. In most situations this will be the copy that is on the system. The Temporary Calendar's name will be the name of the calendar that has been the Personal copy.

The operator is also asked to specify the time span over which the entries are to be reconciled. The beginning time span can be read from the personal copy and entered automatically or if some other beginning time is desired the owner can over write the time entered by the system. The ending time including the date must also be specified or the default period that is defined at installation time will be employed.

The owner is given two options in connection with how he wants certain entries to be handled by the system. These options are designated 'DELETE ENTRIES' and 'REPLACE ENTRIES' and will be explained in detail at the appropriate time.

The reconciling process first identifies Old entries that have not been changed or modified in any way in order to identify Old entries that have been, (a) Deleted on one of the copies, or (b) Been moved to a different time slot on one of the copies, or (c) Been modified on either copy or both in a manner to provide a time stamp that is subsequent to the Copy Time stamp.

Old entries that have not been changed in any way will be in the identical time slots on both copies, will have the same Structure ID and the same Time Stamp.

The Old entries that were deleted on the Personal copy could, under the previous assumptions, only have been deleted by the owner. Old entries on the Host copy were deleted either by the owner's agent or in the case where the event was owned by another calendar owner such as a meeting, by the other calendar owner. If the DELETE ENTRIES option on the Reconcile screen was marked 'YES' then the entries on the Personal copy that were previously deleted are also deleted on the Host copy. If that option had been marked 'NO' then the old entries on the Host copy that were deleted are flagged to be presented to the owner for ratification or veto.

A list referred to as the 'Old List' is developed by identifying entry pairs which have the same Ids and which are assigned to different Time Slots on the copies where one entry has a Time Stamp prior to the 'Copy Time' stamp. These entries represent Old entries which have been modified in the manner indicated in sub-paragraphs (b) or (c) above. The 'old' entries that have been deleted appear on an 'OLD DELETE' list that is developed by identifying an entry that has been deleted on one copy but not on the other copy.

The OLD entries that have been moved to a different time slot are processed so the entry with a time stamp later than the Copy Time Stamp prevails, i.e. if that entry is on the Host copy it remains; if it is on the Personal copy it is transferred to the Host copy.

The OLD entries that have been modified but not moved from their original time slots will have Time Stamps subsequent to the Copy Time stamp. If only one entry has a new Time Stamp that entry prevails. If both entries have new Time Stamps the entries are compared in detail to determine if the respective modifications have created a conflict situation. If the comparison indicates a conflict then the entries are flagged for later presentation to the owner. If the comparison indicates no conflict then the data from both entries is combined on the Host copy.

The New entries present a more straight forward processing approach. A New entry will appear on only one copy of the calendar. A list of entries having time stamps that are later than the Copy Time stamp where each entry has a unique Structure ID will account for all new entries except entries which have been deleted. This list is called the 'NEW LIST'. All new entries will be placed on the Host calender at the Time Slot indicated for the entry. New entries from the Personal Copy which are transferred to the Host copy may cause a conflict if the Time Slot is already occupied. If this occurs both entries are flagged for presentation and resolution of the conflict by the calendar owner.

Entries that are deleted on either copy are deleted on both the Host copy and Personal copy if the Deletion option is selected or are presented for a view and manual edit operation by the user.

There are no modified New entries since they appear as unmodified New entries and are treated accordingly.

Figure 5:
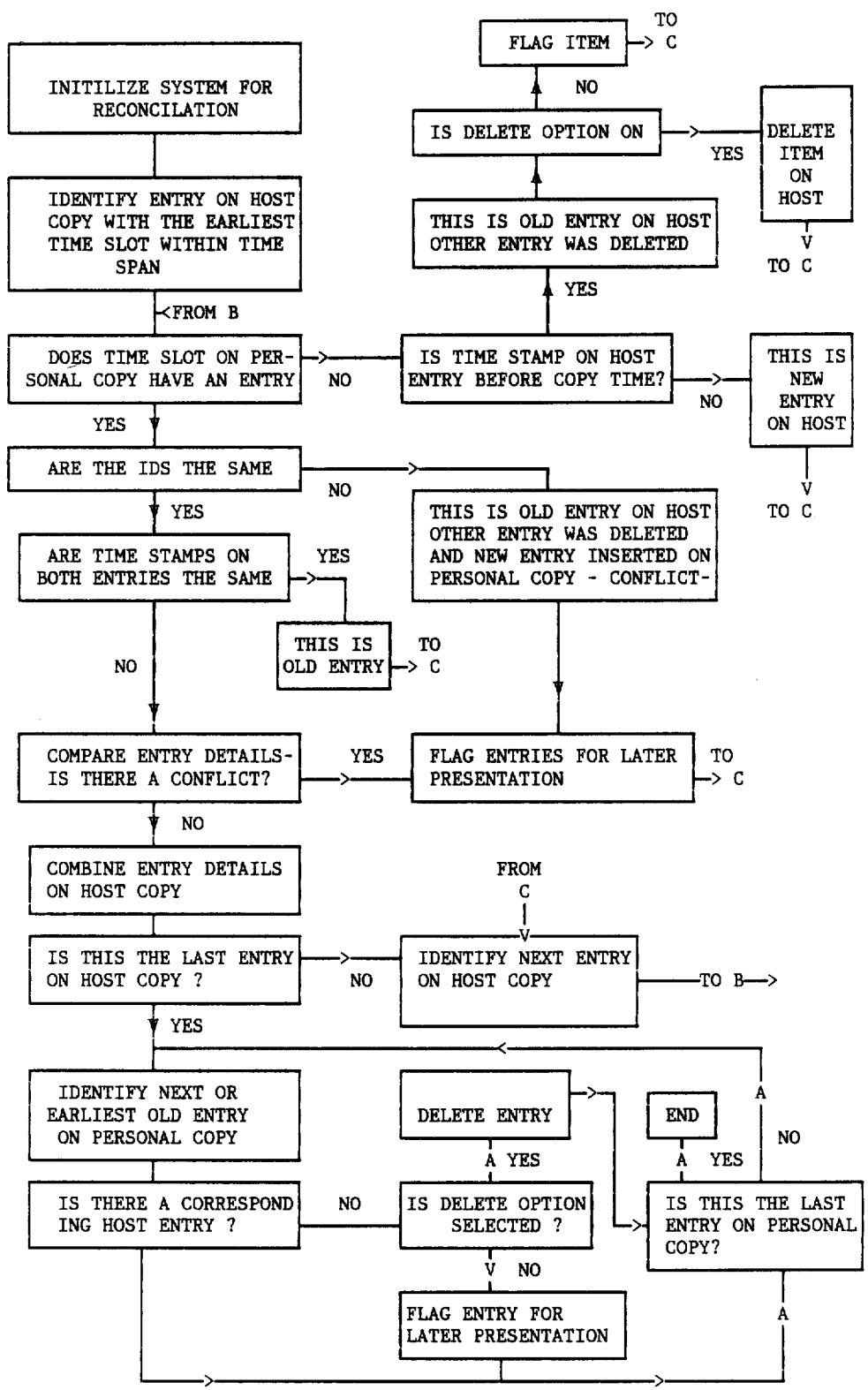
FIG. 5 is a flow chart, illustrating the detailed steps of the method of the present invention.

The above described operation is summarized in the flow chart of FIG. 5.

While the invention has been shown and described with respect to a preferred embodiment, it should be understood that changes and modifications may be made therein without departing from the spirit of the invention or the scope of the appended Claims.

We claim:

1. A method for use in an interactive data processing system including a display device, a keyboard, a system memory, and a diskette storage unit, said system automatically reconciling calendared event entries that have been interactively entered into said system for a specified system user and which exist in an electronic calendar stored in said system and a copy of said electronic calendar stored on a portable diskette, said method assisting said user to develop one correct set of calendar entries whenever independent calendar entries are made to either said calendar stored in said system or to said copy after the time said copy is made, and in which said electronic calendar has a plurality of data structures, each of which identifies information about one calendared event that corresponds to one of said entries and comprises a plurality of fields including one field that identifies a unique time period, said method comprising the following steps, (A) on said display device a first prompting screen to an operator for entering calendar event information via the keyboard, (B) establishing with said system a first field in each data structure of said plurality of data structures for storing a unique ID for an event that is associated with said each data structure, (C) storing with said system said unique ID in said first field when said information is entered into said system to calendar said event, (D) comparing with said system, said unique time periods from pairs of said data structures to determine a same unique time period, (E) comparing with said system, said unique ID's from pairs of said data structures which represent the same said unique time period on said electronic calendar stored in said system memory and on said calendar stored on said diskette to identify pairs of data structures which represent a schedule conflict, and (F) automatically selecting one said data structure of each said pair to be included in said correct set at a corresponding identical unique time period, including the step of,
  (1) presenting to said operator a second prompting screen displaying event information corresponding to each said pair of data structures which represent a schedule conflict, for said operator to select one said data structure of said conflicting pair to be included in said correct set at a corresponding identical time period when said first fields contain different said unique IDs.

2. The method recited in claim 1 in which said system includes at least one workstation which is available to said user for interactively entering calendar information into said system and in which said station includes said display device and said diskette storage unit, and said method includes the further step of,
  (A) recording said copy on said portable diskette at said work station with said diskette storage unit including the step of,
    (b 1) recording a copy time stamp in said copy indicating the time said copy was made.

3. The method recited in claim 2 including the further steps of,
  (A) recording, in said data structure at the time an event is calendared, an event time stamp indicating the time said entry was recorded, and
  (B) identifying data structures representing valid calendared entries that have not been modified or deleted since said copy was made based on the results of said comparing step.

4. The method recited in claim 3 in which said step of identifying includes the further step of,
  (A) comparing said pairs of data structures to determine if said respective IDs are the same and said respective event time stamps are the same, and
  (B) classifying a pair of said data structures as being identical to each other and corresponding to the same said event when both said respective event time stamps are identical and both said respective IDs are identical.

5. The method recited in claim 4 in which said step of classifying includes the further step of,
  (A) classifying a pair of said data structures as representing a schedule conflict between old entries recorded prior to said step of recording said copy time stamp, at least one of which has been modified, when both said IDs are identical but said respective event time stamps are different.

6. The method recited in claim 5 in which said step of comparing said pairs includes the further steps of,
  (A) comparing said event time stamp of each said data structure of said pair against said copy time stamp, and
  (B) classifying each said data structure of said pair as representing a new entry when said IDs are not identical and each said event time stamp is subsequent to said copy time stamp.

7. The method recited in claim 6 including the further step of,
  (A) classifying a pair of said data structures as a scheduling conflict to be resolved interactively by said user during said step of presenting to said operator said second prompting screen displaying said information stored in said data structures that were identified as said scheduling conflict when said IDs are not identical and one said event time stamp is prior to said copy time stamp.

8. The method recited in claim 7 including the further step of,
  (A) classifying one said data structure as storing a new entry to be included in said correct set when only one said data structure of said pair of data structure has stored an event ID in its said ID field.

9. The method recited in claim 8 including the further step of,
  (A) classifying one said data structure of each said pair of said data structures which has not previously been classified, as a new entry when the other data structure of said pair has an event ID field that is empty.

10. The method recited in claim 9 including the further step of,
  (B) entering data into said workstation with said keyboard to cause one of said entries displayed on said second prompting screen to be selected for inclusion in said correct set.

11. The method recited in claim 10 further including the step of
  (A) combining on said calendar maintained by said system, said data structures that are stored on said diskette which have been interactively selected.

* * * * *

UNITED STATES PATENT AND TRADEMARK OFFICE
CERTIFICATE OF CORRECTION

PATENT NO. : 4,866,611

DATED : September 12, 1989

INVENTOR(S) : C. M. N. Cree et al

It is certified that error appears in the above-identified patent and that said Letters Patent is hereby corrected as shown below:

Col. 33, line 22, please delete "(b 1)" and insert --(1)--; and

Col. 34, line 28, please delete "structure" and insert --structures--.

Signed and Sealed this

Third Day of August, 1993

Attest:

MICHAEL K. KIRK

Attesting Officer

Acting Commissioner of Patents and Trademarks

Disclaimer

4,866,611—Charles M. N. Cree; Grady J. Landry; Keith J. Scully, all of Austin, Tex.; Harinder S. Singh, Boca Raton, Fla. METHOD FOR AUTOMATICALLY RECONCILING ENTRIES ON TWO COPIES OF INDEPENDENTLY MAINTAINED ELECTRONIC CALENDARS Patent dated Sep. 12, 1989. Disclaimer filed Oct. 4, 2006, by the assignee, International Business Machines Corporation.

Hereby enter this disclaimer to all claims, of said patent.

*(Official Gazette, January 9, 2007)*